United States Patent Office 2,857,354
Patented Oct. 21, 1958

2,857,354
PROCESS OF MAKING GLYCIDYL METHACRYLATE POLYMER COMPOSITION CONTAINING SAME, AND PRODUCT COATED THEREWITH

James C. Fang, Sharon Hill, Pa., assignor to E. I. du Pont de Nemours and Company, Wilmington, Del., a corporation of Delaware No Drawing. Application July 20, 1955
Serial No. 523,369

13 Claims. (Cl. 260—33.2)

This invention relates to organic coating compositions, particularly liquid coating compositions containing soluble organic film-forming polymers which are capable of being cross-linked to an insoluble state.

Organic coatings which are hard, adherent and flexible and which are not easily harmed by water, soap, grease, light and prolonged heat are very desirable for protecting and decorating a wide variety of articles such as automobile bodies, refrigerators, washing machines, kitchen cabinets, and food mixers.

It is the principal object of this invention to provide new liquid organic coating compositions which can be applied as thin coatings to articles like those just mentioned and which provide, when dry, the previously described desirable properties.

A further object is to provide articles, particularly metal articles, coated with these new coating compositions.

These objects are accomplished by providing liquid coating compositions comprising (1) a copolymer of glycidyl methacrylate and an ethylenically unsaturated compound of the class consisting of styrene, methyl methacrylate and butyl methacrylate, (2) a saturated straight chain aliphatic dicarboxylic acid containing 5 to 20 carbon atoms per molecule in the amount of 0.3–1.0 mol per mol of glycidyl methacrylate, and (3) volatile organic solvent for said copolymer and said acid.

The coated articles of this invention are prepared by spraying, dipping or otherwise applying a liquid coating composition of this invention on the surface of the article being coated and heating to bake or cure the coating. The article can be bare or primed with a suitable primer. Coatings of other coating compositions can be applied over the coatings of this invention. The thickness of the coatings of this invention is usually of the order of 0.5–3.0 mils.

The following examples illustrate the principles and practice of this invention, but it is not intended to be limited thereby. Unless otherwise indicated, the parts and percentages are by weight.

Example 1

A copolymer containing about 70% polymerized styrene and about 30% polymerized glycidyl methacrylate by weight was prepared as follows:

930 grams of xylene were placed in a five-liter flask equipped with a thermometer, an agitator, a reflux condenser, and a nitrogen inlet, and were heated to reflux temperature (about 135° C.) under a nitrogen atmosphere. A mixture containing 650 grams of styrene, 279 grams of glycidyl methacrylate and 18.5 grams of ditertiarybutyl peroxide was divided into four equal portions. Fifteen minutes after the xylene had started to reflux, one quarter of the mixture was added, and the remaining quarters were subsequently added at 30 minute intervals while the charge was maintained at reflux temperature under a nitrogen atmosphere. After the last portion had been added, the charge was refluxed for four hours and was then cooled to room temperature.

The resulting clear solution had a copolymer content of 50.2% by weight. The copolymer (substantially freed of solvent) had a molecular weight of about 2600 by the boiling point elevation method.

A clear coating composition of this invention having the following formula was prepared by separately preparing solutions of the ingredients of the first and second portions and then mixing the two solutions together:

First portion: Grams
Styrene/glycidyl methacrylate copolymer solution prepared above_____ 100
Xylene _____ 100
Second portion:
Sebacic acid _____ 21
Ethylene glycol monobutyl ether_____ 100
Xylene _____ 50

Since the copolymer solution conatined about 15 grams of polymerized glycidyl methacrylate (0.106 mol), the sebacic acid (0.104 mol) was present in the amount of about 0.98 mol per mol of glycidyl methacrylate.

This clear coating composition was poured on a bonderited steel panel, and the excess was drained off. The panel was baked for 20 minutes at 400° F. The resulting coating was smooth, clear, glossy, hard, adherent, flexible and resistant to water, grease, soap, gasoline and salt solution. It was insoluble in xylene, which is a solvent for the starting copolymer.

Example 2

A pigmented coating composition of this invention having the following formula was prepared by grinding the ingredients in conventional paint grinding apparatus until a smooth dispersion was produced:

Grams
Styrene/glycidyl methacrylate copolymer solution prepared in Example 1_____ 100.0
Azelaic acid _____ 9.9
Ethylene glycol monobutyl ether_____ 40.0
Titanium dioxide pigment_____ 48.0

Since the copolymer solution contained about 15 grams of polymerized glycidyl methacrylate (0.106 mol), the azelaic acid (0.053 mol) was present in the amount of about 0.5 mol per mol of glycidyl methacrylate.

This white pigmented coating composition was thinned to spraying viscosity with a mixture of equal parts by weight of ethylene glycol monobutyl ether and xylene and was sprayed on a primed steel panel in an amount sufficient to yield a dry film about 2.5 mils thick. The panel was baked for 30 minutes at 350° F. The resulting coating had properties similar to those described for the product of Example 1. The coating was also durable outdoors. This combination of properties makes the product of this example useful as a protective and decorative coating for such articles as automobile bodies, metal signs, refrigerators and the like.

A clear unpigmented analog of this composition was prepared by merely mixing the copolymer, the azelaic acid and the ether in the amounts shown.

Other analogs of the clear or pigmented products of this example are made by substituting for the azelaic acid used therein 7.7 grams of adipic acid, 10.7 grams of sebacic acid, or 18 grams of octadecane-1,18-dicarboxylic acid (eicosanedioic acid), respectively.

Examples 3–6

The following four copolymers were prepared by placing the ingredients in sealed glass bottles and tumbling the bottles for 16 hours in a bath at 75°–85° C.

Example 3—copolymer solution: Grams
Methyl methacrylate _____ 32.5
Glycidyl methacrylate _____ 17.5
Acetone _____ 120.0
Alpha, alpha-azodiisobutyronitrile _____ 1.0
(Copolymer molecular weight approx. 3200.)

Example 4—copolymer solution:
Butyl methacrylate _____ 35.0
Glycidyl methacrylate _____ 15.0
Acetone _____ 120.0
Alpha, alpha-azodiisobutyronitrile _____ 1.0
(Copolymer molecular weight approx. 3600.)

Example 5—copolymer solution:
Butyl methacrylate _____ 37.5
Glycidyl methacrylate _____ 12.5
Acetone _____ 120.0
Alpha, alpha-azodiisobutyronitrile _____ 1.0
(Copolymer molecular weight approx. 3300.)

Example 6—copolymer solution:
Methyl methacrylate _____ 760.00
Glycidyl methacrylate _____ 40.00
Toluene _____ 1200.00
Benzoyl peroxide (98%) _____ 4.56
(Copolymer molecular weight approx. 85,000.)

Four clear coating compositions of this invention are prepared by mixing the ingredients in the amounts indicated below. In each case, about 0.5 mol of dibasic acid is used per mol of glycidyl methacrylate.

Example 3—coating composition: Grams
65/35 methyl methacrylate/glycidyl methacrylate copolymer solution _____ 171.0
Adipic acid _____ 9.0

Example 4—coating composition:
70/30 butyl methacrylate/glycidyl methacrylate copolymer solution _____ 171.0
Azelaic acid _____ 10.0

Example 5—coating composition:
75/25 butyl methacrylate/glycidyl methacrylate copolymer solution _____ 171.0
Sebacic acid _____ 9.0

Example 6—coating composition:
95/5 methyl methacrylate/glycidyl methacrylate copolymer solution _____ 618.0
Toluene _____ 156.0
Sebacic acid _____ 9.2

Coatings of the products of Examples 3–6 when baked for 30 minutes at 350° F. on metal panels are clear, hard, adherent and flexible and are insoluble in the solvents used in the corresponding liquid coating compositions.

*Example 7*

A copolymer containing about 50% polymerized styrene and about 50% polymerized glycidyl methacrylate by weight was prepared by the method of Example 1 using the following ingredients:

Grams
Xylene _____ 600
Styrene _____ 300
Glycidyl methacrylate _____ 300
Ditertiarybutyl peroxide _____ 12

The resulting clear solution had a copolymer content of 50.3% by weight.

This copolymer solution is converted into a coating composition of this invention, either clear or pigmented, by adding 0.3–1.0 mol (per mol of glycidyl methacrylate) of a dibasic acid of the character used in any of the foregoing examples and, optionally, by grinding pigment therein.

The foregoing examples illustrate a wide variety of specific embodiments of this invention. The use of equivalent ingredients in other embodiments will be obvious to persons skilled in the copolymer and coating composition arts.

For example, other copolymers of glycidyl methacrylate and an ethylenically unsaturated compound of the class consisting of styrene, methyl methacrylate and butyl methacrylate can be substituted for all or part of the corresponding copolymers in the examples. Minor amounts of other polymerizable monomers which are innocuous in the functioning of these copolymers can be added in preparing the copolymers. The copolymers contain about 5%–50% by weight of polymerized glycidyl methacrylate and 95%–50% of styrene, methyl methacrylate or butyl methacrylate, i. e. the weight ratio of glycidyl methacrylate to the other ethylenically unsaturated compound is between 5:95 and 50:50. The preferred ratio is between 15:85 and 30:70 on the same basis.

Likewise other polymerization methods and other polymerization catalysts, e. g. other free-radical initiators can be used.

Other 5–20 carbon atom saturated straight chain aliphatic dicarboxylic acids can be used in place of all or part of the corresponding acids in the examples and, in the amount of 0.3–1.0 mol per mol of glycidyl methacrylate in other coating compositions of this invention. The preferred amount of acid is about 0.5 mol per mol of glycidyl methacrylate. Preferred acids are azelaic acid and sebacic acid.

Other volatile organic solvents for the copolymer/acid mixtures can be used such as esters, ketones and aromatic hydrocarbons.

Other pigments can be used, such as carbon blacks phthalocyanine blues and greens, organic maroons, and metal oxides, hydroxides, silicates, sulfates, sulfides and chromates.

Well-known additives for coating compositions can be incorporated in the products of this invention, when desirable, such as baking catalysts (e. g. alkyl ammonium halides), surface active agents (e. g. liquid silicones), and pigment dispersing agents.

Although the examples describe the use of the coating compositions of this invention on steel, they can be used on other substrates which are not adversely affected by the baking operations, including other metals (e. g. aluminum, copper, magnesium, and alloys thereof), glass, ceramics, asbestos, and (when moderate baking conditions are permissible) wood. The preferred baking schedules vary from 30 minutes at 250° F. to 5 minutes at 500° F. depending on the substrate and the degree of curing required.

The coating compositions of this invention can be used directly on the bare substrate, over previously applied coatings, or under subsequently applied coatings, as desired.

The products of this invention are most useful for preparing baked coatings on steel articles, such as refrigerators, washing machines, kitchen cabinets, and automobile bodies.

It is apparent that many widely different embodiments of this invention can be made without departing from the spirit and scope thereof; and, therefore, it is not intended to be limited except as indicated in the appended claims.

I claim:
1. A liquid coating composition comprising (1) a copolymer of glycidyl methacrylate and an ethylenically unsaturated compound of the class consisting of styrene, methyl methacrylate, and butyl methacrylate, in which the ratio of glycidyl methacrylate to ethylenically unsaturated compound is between 5:95 and 50:50 by weight, (2) a saturated straight chain aliphatic dicarboxylic acid containing 5–20 carbon atoms per molecule, in the amount of 0.3–1.0 mol per mol of glycidyl methacrylate, and (3) volatile organic solvent for said copolymer and said acid.

2. A product of claim 1 in which the ratio of glycidyl methacrylate to the ethylenically unsaturated compound is between 15:85 and 30:70.

3. A product of claim 1 in which the copolymer is a copolymer of glycidyl methacrylate and styrene.

4. A product of claim 1 in which the copolymer is a copolymer of glycidyl methacrylate and methyl methacrylate.

5. A product of claim 1 in which the copolymer is a copolymer of glycidyl methacrylate and butyl methacrylate.

6. A product of claim 1 in which the copolymer has a molecular weight between about 2600 and about 85,000.

7. A product of claim 1 in which the dicarboxylic acid is present in the amount of about 0.5 mol per mol of glycidyl methacrylate.

8. A product of claim 1 in which the dibasic acid is azelaic acid.

9. A product of claim 1 in which the dicarboxylic acid is sebacic acid.

10. An article having a baked coating of a product of claim 1.

11. A product of claim 1 further containing pigment.

12. An article having a baked coating of a product of claim 11.

13. The process of cross-linking a copolymer of glycidyl methacrylate and an ethylenically unsaturated compound of the class consisting of styrene, methyl methacrylate, and butyl methacrylate, in which copolymer the ratio of glycidyl methacrylate to ethylenically unsaturated compound is between 5:95 and 50:50 by weight, which process comprises heating said copolymer in the presence of 0.3–1.0 mol, per mol of glycidyl methacrylate, of a saturated straight chain aliphatic dicarboxylic acid containing 5–20 carbon atoms per molecule.

References Cited in the file of this patent

UNITED STATES PATENTS

| | | |
|---|---|---|
| 2,580,901 | Erickson et al. | Jan. 1, 1952 |
| 2,606,810 | Erickson et al. | Aug. 12, 1952 |
| 2,660,563 | Banes et al. | Nov. 24, 1953 |
| 2,703,765 | Osdal | Mar. 8, 1955 |
| 2,801,232 | Suen et al. | July 30, 1957 |